United States Patent
Leibowitz

[11] 3,781,085
[45] Dec. 25, 1973

[54] LIQUID CRYSTAL DISPLAY
[75] Inventor: Marshall Leibowitz, Englewood, N.J.
[73] Assignee: Ing. C. Olivetti & C., S.p.A., Invrea, Italy
[22] Filed: May 10, 1972
[21] Appl. No.: 251,993

[52] U.S. Cl............................ 350/150, 350/160 LC
[51] Int. Cl. .............................................. G02f 1/16
[58] Field of Search....................... 350/150, 160 LC

[56] References Cited
UNITED STATES PATENTS
3,600,060  8/1971  Churchill et al............. 350/160 LC
3,700,306  10/1972  Cartmell et al..................... 350/150
3,646,384  2/1972  Lay.................................. 313/109.5

OTHER PUBLICATIONS
Kazan "Liquid–Crystal Image Intensifier and Recorder" IBM Technical Disclosure Bulletin, Vol. 12, No. 6, Nov. 1969, pp. 864, 865.

Schadt et al., "Voltage–Dependent Optical Activity of a Twisted Nematic Liquid Crystal" Applied Physics Letters, Vol. 18, No. 4, Feb. 15, 1971, pp. 127, 128.

*Primary Examiner*—Edward S. Bauer
*Attorney*—Kevin McMahon

[57] ABSTRACT

A liquid crystal display in which a layer of liquid crystal material is confined between a pair of spaced parallel substrates. A common electrode is deposited on one of the substrates, and a plurality of independent conductive spots are deposited on the interior face of the other of the substrates opposite to the common electrode. Electrical field producing means are provided for inducing a voltage in a selected conductive spot in order to excite the liquid crystal material between the selected conductive spot and the common electrode.

6 Claims, 5 Drawing Figures

PATENTED DEC 25 1973 3,781,085

LIQUID CRYSTAL DISPLAY

BACKGROUND OF THE INVENTION

The invention relates generally to liquid crystal displays and more particularly to liquid crystal displays having external sources of excitation.

There are several types of liquid crystal materials which have operating characteristics which make them suitable for alphanumeric, television, and other types of displays, light shutters, etc. One type nematic liquid crystal material operates on the principle of dynamic scattering. When they're in the unexcited state, they are relatively transparent, but when excited by an electric field reflect the major portion of the incident light. When mixed with cholesteric liquid crystal materials, this type of nematic liquid crystal material exhibits memory properties, i.e., the material remains in the light scattering mode even after the excitation field is removed.

Another type of nematic liquid crystal material which is described in an article entitled "Voltage Dependent Optical Activity of a Twisted Nematic Liquid Crystal," which appears in the February 15, 1971, issue of THE APPLIED PHYSICS LETTERS, operates by twisting the orientation of incident polarized light through an angle of 90° when not excited, and by passing the incident polarized light untwisted when energized by an excitation voltage. With the aid of polarizers, this display can be arranged to yield either a black-on-white or a white-on-black display.

Liquid crystal displays are generally constructed by confining a layer of liquid crystal material between a pair of electrodes which are deposited on the interior faces of a pair of substrates, at least one of the substrated and electrodes deposited thereon being transparent.

In known liquid crystal displays it has been necessary to make external electrical connections to each of the electrode segments on a substrate. It has thus been somewhat difficult to produce displays in which it is possible to excite the liquid crystal only at selected points in the display without exciting surrounding areas. It has been suggested in U.S. Pat. No. 3,499,702 to Goldmacher et al. to use a matrix type of electrode construction in which a plurality of horizontal electrodes are deposited on one substrate while a plurality of vertical electrodes are deposited on the other substrate. In order to excite the liquid crystal material at a point in the display, an excitation voltage is applied to the horizontal and vertical electrodes crossing at that point, thereby exciting the liquid crystal material at their intersection.

This solution has not proved particularly satisfactory, however, because of the fact that the response of the liquid crystal material to an excitation voltage is rather linearly related to the magnitude of the excitation voltage. Thus, portions of the liquid crystal materials receiving half the excitation voltage are also partially excited and scatters a portion of the incident light.

SUMMARY OF THE INVENTION

In order to overcome these and other problems, the Applicant provides a liquid crystal display according to the present invention in which a layer of liquid crystal material is confined between a pair of spaced parallel substrates which comprises a common electrode on one of the substrates and a plurality of independent conductive spots on the other of the substrates opposite the common electrode. Means are also provided for providing an electric field on the other substrate at a selected region thereof for energizing the conductive spot located in the selected region.

DETAILED DESCRIPTION

Figure 1:
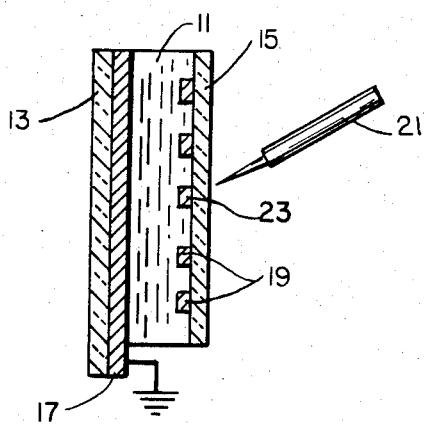
FIG. 1 is a sectional edge view of a liquid crystal display according to the invention.
Figure 2:
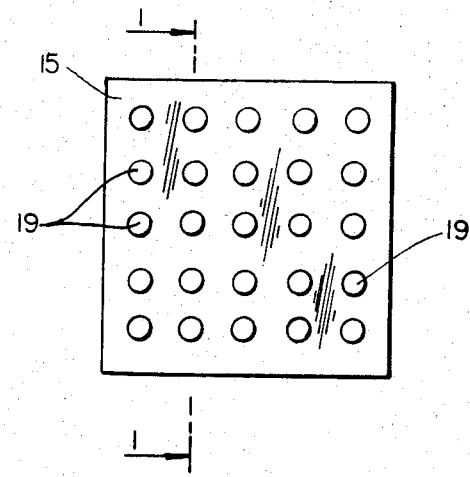
FIG. 2 is a view of the electrode structure on one of the substrates of a liquid crystal display according to the invention

Referring now to FIGS. 1 and 2 of the drawings there is shown a liquid crystal display in which a dynamic scattering type nematic liquid crystal material 11 is confined between a pair of substrates 13 and 15. A common electrode 17 is deposited on the interior face of electrode 13 and may be uniform on the face of substrate 13 over the entire area of the display. A plurality of conductive spots 19 are deposited on the interior face of the other substrate 15 directly opposite the common electrode 17.

For a light transmissive type display, both electrodes 17 and 19 should be transparent, whereas for a reflective type display, either electrode 17 should be reflective or, if both the electrodes 17 and 19 are transparent, a reflective surface may be placed behind the substrate 13. The electrodes and substrates may be formed of a well known material and according to well known techniques which will not be described further herein.

In order to excite the portion of liquid crystal material between a selected one 23 of the spots 19 and the electrode 17, a source of an A-C electrical field such as tesla coil 21 is brought close to the substrate 15 in the region of the selected spot 23. The field of the tesla coil 21 penetrates the substrate 15, which is generally quite thin, on the order of 50 mils or less, and induces an A-C voltage in the selected spot 23 which it is brought near. Thus, an A-C electric field is present between the grounded common electrode 17 and the selected conductive spot 23, which field causes the liquid crystal material therebetween to scatter incident light.

Since the electric field of the tesla coil is well defined and covers only a small region of the substrate 15, it is possible to energize a single selected one of the spots 19 as long as the spots 19 are sufficiently separated one from the other. For energization with a tesla coil, spot separation distances of at least one-eighth inch are preferred, if it is desired to be able to energize a single spot 19 at a time.

The magnitude of the A-C excitation voltage needed to energize the liquid crystal material between a selected spot 23 and the grounded electrode 17 depends on the type liquid crystal material 11 and the thickness of the substrate 15. For typical dynamic scattering type materials 11 and a substrate 15 having a thickness of 2 mils, a field strength of about 25 volts is needed to cause scattering. For 50 mil thick glass, a field strength of about 500 volts is needed.

Typical dynamic scattering type liquid crystals are N(p-Methoxylenzylidene-p-n-butylanidine (MBBA) or N(p-Ethoxy-lenzylidine)-p-n-butylaniline (EBBA).

If the liquid crystal material 11 is of the dynamic scattering, nematic type, the removal of the tesla coil 21 from the region of the selected spots 23 deenergizes it and returns the liquid crystal material 11 to the transparent state. If, however, the liquid crystal material 11 is a mixture of dynamic scattering type nematic and cholesteric materials, the mixture has a memory capability and remains excited even after the removal of the tesla coil 21 from the region of the selected spot 19. Thus, in this case, the tesla coil 21 may be used to write information onto a liquid crystal display panel.

In order to erase the information stored in the display, it is necessary to excite the liquid crystal material 11 with an A-C electric field having a frequency of at least 600K. The embodiment of the invention illustrated in FIGS. 3 and 4 of the drawings may be used.

Figure 3:
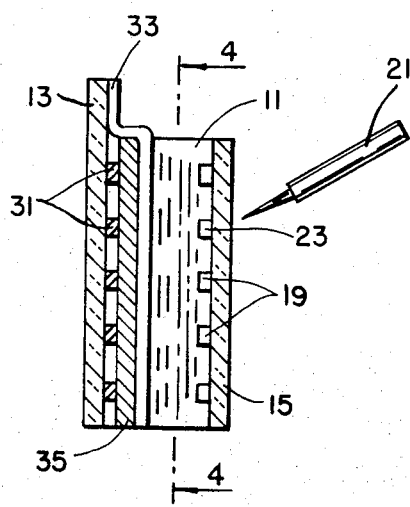
FIG. 3 is a sectional edge view of a liquid crystal according to a second embodiment of the invention.
Figure 4:
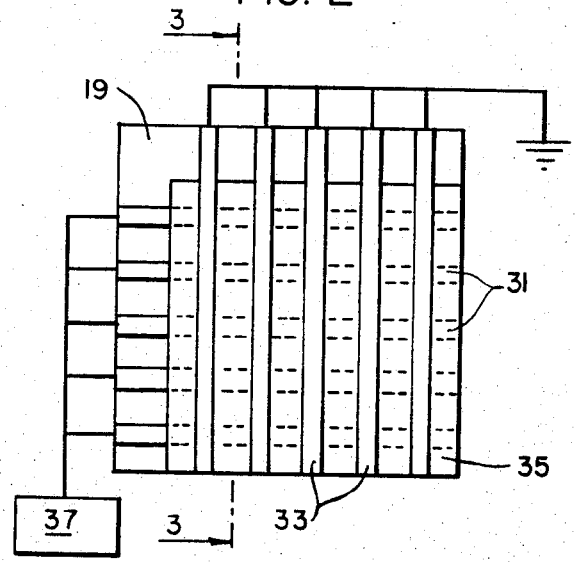
FIG. 4 is a view of the electrode structure on one of the substrates of the display of FIG. 3.

As seen in FIGS. 3 and 4, there are in this embodiment of the invention two layers of electrodes 31 and 33 deposited on the interior face of substrate 13 with a layer of dielectric material 35 deposited between them. The electrodes 31 and 33 are shown deposited in rows and columns respectively on substrate 13 with the intersection of the row electrodes 31 and column electrodes 33 being aligned with the conductive spots 19 on substrate 15 (FIG. 2). The outer electrodes 33 are connected to a point of reference potential, and it is between these electrodes 33 and the selected conductive spots 23 on substrate 15 that the activation field exists. The row electrodes 31, which are shown deposited directly on the substrate 13, are connected to high frequency erasing voltage source 37 for supplying an erasing voltage to the cell when it is desired to destroy the information stored in the cell.

It is preferable to have the electrodes 31 and 33 in the cross grid pattern shown in FIGS. 3 and 4, since the erasing field in the liquid crystal material 11 is generated by the fringing fields which exist between electrodes 31 and 33 when the erasing voltage is applied to the electrodes 31 and the electrodes 33 are grounded. This phenomenon is described in more detail in Applicant's copending patent application Ser. No. 205,864 which was filed on DEC. 8, 1971, and which is hereby included by reference. It is, of course, also possible to connect the erasing electrodes 31 individually to erasing voltage source 37 so that portions of the display may be erased selectively while retaining other portions.

Memory-type liquid crystal materials are typically made of a mixture of about 80 percent by weight dynamic scattering type nematic liquid crystal materials such as MBBA or EBBA and about 10 percent by weight of a cholesteric liquid crystal material such as cholesteryl nonanoate or cholesteryl chloride.

Figure 5:
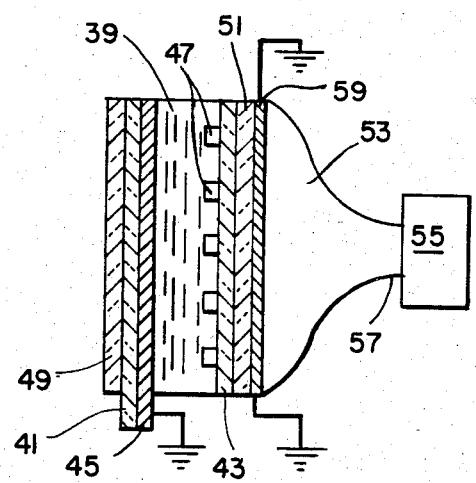
FIG. 5 is an edge view of a third embodiment of a liquid crystal display according to the invention.

Referring now to FIG. 5 of the drawings, there is illustrated an embodiment of a liquid crystal display according to the invention which makes use of the low voltage orientation type nematic liquid crystal material. The low voltage liquid crystal material 39 is confined between a pair of parallel substrates 41 and 43. A common electrode 45 is deposited uniformly over the interior face of the substrate 41, and the conductive spot type electrodes 47 are distributed over the interior face of substrate 43 in the same manner as was illustrated with electrodes 19 on substrate 15 (FIG. 2). Polarizing layers 49 and 51 are placed over the exterior faces of substrates 41 and 43 respectively. For a black-on-white display, the polarizing layers 49 and 51 are arranged with their directions of polarization at right angles to each other, while for a white-on-black display, they are oriented parallel to each other. In order to energize selected portions of a liquid crystal material 39 the common electrode 45 is connected to a point of reference potential and a selected one of the electrode 47 is energized with a source of A-C or D-C electrical field.

The embodiments of the invention illustrated in FIGS. 1 through 4 of the drawings, use liquid crystal materials which operate in a dynamic scattering mode. Since this mode requires some current flow through the liquid crystal material to produce the dynamic scattering, it is necessary to use a source of an A-C electric field to excite the conductive spots 19. However, since the low voltage orientation type liquid crystal material 39 does not depend on dynamic scattering, but rather operates on the effect on the polarization of incident light of the alignment of the molecules of a liquid crystal material, either A-C or D-C excitation voltage may be used.

Generally the interior faces of the substrates 41 and 43 are rubbed or otherwise treated so that the molecules of liquid crystal material 39 in the vicinity of the substrate orient themselves parallel to the substrate in a preselected direction. The substrates 41 and 43 are arranged so that the molecules in the vicinity of substrate 41 tend to orient themselves at right angles to the molecules in the vicinity of the substrate 43 thereby producing a corkscrew effect in the molecules of the liquid crystal material 39. Light incident on the substrate 43 and polarized parallel to the orientation of the molecules of the liquid crystal material in the vicinity of the substrate 43, is therefore twisted through 90° by the liquid crystal material and passes through the substrate 41 polarized parallel to the direction of the orientation of the molecules of liquid crystal material 39 in the vicinity of the substrate 41. When an electric field is applied between a selected one of the spots 47 and the common electrode 45, the molecules of the portion of the liquid crystal material 39 therebetween align themselves in the direction of the field and perpendicular to the plane of substrates 41 and 43. With the molecules in this direction, polarized light passing through this portion of the liquid crystal material 39 is not shifted through an angle, but retains its original orientation. Thus, if the polarizing layers 49 and 51 are oriented at right angles to one another with the direction of polarization parallel to the orientation of the molecules of liquid crystal material 39 in the vicinity of the adjacent substrate 41 and 43 respectively, light incident on a polarizing layer 49 or 51 is twisted through an angle of 90° and passes through the display unimpeded. Light incident on an energized portion of the display is not twisted, however, and so is blocked by the polarizing layer 49 or 51 on the side of the display opposite the side of incidence.

A typical orientation-type nematic liquid crystal material is a mixture of these components each given by the formula

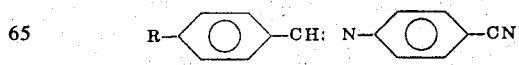

where $R_1 = n - C_4H_9 O -$
$R_2 = n - C_6H_{13} O -$
$R_3 = n - C_7H_{15} O -$
mixed in molar proportions of 1:1:1.

As seen in FIG. 5, it is possible to energize the conductive spots 47 of a liquid crystal display by means other than a tesla coil. In this embodiment, an electron beam of the type generated by a cathode ray tube or television tube is used to energize the conductive spots 47 of the display. The sealed airtight envelope 53, which has substrate 43 as its front face, is provided with a normal electron beam generating mechanism 55 located in the neck 57 of the envelope 53. The beam may be directed in the well known manner to any selected region of the substrate 43 for energizing the conductive spot 47 located in that region. A layer of resistive material 59 is deposited on the interior side of the front face of the envelope 53, in order to allow the charge built up by the electron beam to dissipate. The resistive layer 59 may, for instance, be formed of a very thin layer (on the order of hundreds of angstroms) of SnO having an impedance such that the discharge time of the R-C circuit, made up of the resistive layer 59 and the liquid crystal cell respectively, discharges in the time required by the particular application. Other materials may, of course, also be used as long as the impedance of the deposited layer 59 is in the desired range. As shown in FIG. 5, the resistive layer 59 is connected at its periphery to reference potential.

It is, of course, equally possible to energize the embodiment of a liquid crystal display of FIG. 5 with a tesla coil or other source of A-C or D-C excitation in the same manner as was described for the embodiments of FIGS. 1 through 4 of the drawings, in which case it would not be necessary to have the resistive layer 59. Furthermore, it is possible to eliminate the separate polarizing layers 49 and 51 by using polarized materials for substrates 41 and 43.

The tesla coil and the electron beam, which are described in reference to the illustrated embodiment of the invention, are given by way of example only, and it should be apparent that other electrical field generating mechanisms could equally well be used.

I claim:

1. A liquid crystal display in which a layer of liquid crystal material is confined between a pair of spaced parallel substrates comprising:
   a common electrode on one of said substrates;
   a plurality of independent conductive spots on the interior face of the other of said substrates opposite said common electrode; and
   means for irradiating a selected conductive spot with an A-C electric field from the exterior side of said other substrate for inducing an electrical potential between said selected conductive spot and said common electrode for exciting the liquid crystal material therebetween.

2. A liquid crystal display of claim 1 wherein said common electrode is deposited uniformly over the interior face of said one substrate in the area of said one substrate encompassed by the display.

3. A liquid crystal display of claim 1 wherein said liquid crystal material has a memory capability and wherein said display further includes means for generating an electric field for erasing information stored in said display.

4. The liquid crystal display of claim 3 wherein said common electrode is formed of a plurality of conductive stripes deposited over the interior face of said one substrate and wherein said erasing means includes a second plurality of conductive stripes deposited on the interior surface of said one substrate, under, at right angles with, and insulated from said plurality of conductive stripes of said common electrode, and means for applying an A-C voltage between electrodes of said plurality of conductive stripes of said common electrode and said second plurality of conductive stripes.

5. The liquid crystal display of claim 4 wherein the frequency of said erasing voltage is at least 600 hertz.

6. The liquid crystal display of claim 1 wherein said liquid crystal material is of the low voltage orientation type, said display further including means associated with each of said substrates for polarizing light passing through said substrates.

* * * * *